United States Patent
Shimazaki et al.

(10) Patent No.: US 7,950,672 B2
(45) Date of Patent: May 31, 2011

(54) MAGNETIC FLUID SEALING DEVICE

(75) Inventors: Yasuyuki Shimazaki, Akishima (JP); Kiyoshi Akiyama, Akishima (JP)

(73) Assignee: Rigaku Corporation, Tokyo (JP)

( * ) Notice: Subject to any disclaimer, the term of this patent is extended or adjusted under 35 U.S.C. 154(b) by 675 days.

(21) Appl. No.: 11/988,202

(22) PCT Filed: Jun. 29, 2006

(86) PCT No.: PCT/JP2006/313445
§ 371 (c)(1),
(2), (4) Date: Dec. 31, 2007

(87) PCT Pub. No.: WO2007/004690
PCT Pub. Date: Jan. 11, 2007

(65) Prior Publication Data
US 2009/0115137 A1    May 7, 2009

(30) Foreign Application Priority Data
Jun. 30, 2005    (JP) ................ 2005-191200

(51) Int. Cl.
*F16J 15/43*    (2006.01)
(52) U.S. Cl. ................................. 277/410
(58) Field of Classification Search ........... 277/410
See application file for complete search history.

(56) References Cited

U.S. PATENT DOCUMENTS

| | | | | |
|---|---|---|---|---|
| 4,293,137 A * | 10/1981 | Ezekiel | ........................ | 277/410 |
| 4,407,508 A * | 10/1983 | Raj et al. | ........................ | 277/302 |
| 4,526,382 A * | 7/1985 | Raj et al. | ........................ | 277/410 |
| 4,527,805 A * | 7/1985 | Gowda et al. | ........................ | 277/410 |
| 4,545,587 A | 10/1985 | Higgins | | |
| 4,575,102 A | 3/1986 | Raj et al. | | |
| 4,605,233 A * | 8/1986 | Sato | ........................ | 277/410 |
| 4,844,138 A * | 7/1989 | Kokubu | ........................ | 152/417 |
| 5,092,611 A | 3/1992 | Ehmsen et al. | | |
| 5,340,122 A * | 8/1994 | Toboni et al. | ........................ | 277/410 |
| 5,799,951 A * | 9/1998 | Anderson et al. | ........................ | 277/301 |
| 6,247,701 B1 * | 6/2001 | Kitada et al. | ........................ | 277/410 |
| 7,129,609 B1 * | 10/2006 | Mikhalev et al. | ........................ | 310/90.5 |
| 7,398,974 B1 * | 7/2008 | Mikhalev et al. | ........................ | 277/410 |
| 2009/0115137 A1 * | 5/2009 | Shimazaki et al. | ........................ | 277/410 |

FOREIGN PATENT DOCUMENTS

| | | |
|---|---|---|
| EP | 0 183 477 | 6/1986 |
| JP | 61-165072 | 7/1986 |
| JP | 62-20268 | 2/1987 |
| JP | 62-278377 | 12/1987 |
| JP | 3-48071 | 3/1991 |
| JP | 7-20469 | 4/1995 |
| JP | 10-220596 | 8/1998 |
| WO | WO-98/14726 | 4/1998 |

\* cited by examiner

*Primary Examiner* — Alison K Pickard
(74) *Attorney, Agent, or Firm* — Jordan and Hamburg LLP

(57) ABSTRACT

A magnet is embedded in an outer rotational shaft provided in a bearing hole of a case, and an outer magnetic circuit and an inner magnetic circuit are formed on the outer peripheral surface and inner peripheral surface of the outer rotational shaft, respectively. In a magnetic fluid seal device, magnetic fluid is filled in minute gaps coming in contact with the outer peripheral surface and inner peripheral surface of the outer rotational shaft, and the two rotational shafts can be strongly sealed by the magnetic circuits formed by a magnet. As a result, the rotational shafts can be rotated while supported in a non-contact style. In addition, the dimension can be reduced, and the number of parts can be reduced.

7 Claims, 5 Drawing Sheets

MAGNETIC FLUID SEALING DEVICE

BACKGROUND OF THE INVENTION

1. Technical Field

The present invention relates to a magnetic fluid seal device for sealing a rotational shaft by using magnetic fluid.

2. Background Art

A magnetic fluid seal device is an optimum device for a bearing mechanism for transmitting the rotational driving force of a motor or the like to a special environment such as an ambient atmosphere having a different outside air pressure difference, a vacuum chamber or the like, for example.

Particularly, the magnetic fluid seal device rotating biaxially on the same axis (hereinafter referred to as "biaxial rotational magnetic fluid seal device") is broadly applied as a rotational driving part of an X-ray diffraction device for testing semiconductor wafer, a vacuum transfer robot or the like.

FIG. 5 is a side cross-sectional view showing the construction of a biaxial rotational magnetic fluid seal device known as a prior art.

As shown in FIG. 5, the biaxial rotational magnetic fluid seal device 1 is equipped with a cylindrical case 10 which has a bearing hole 2 therein and is made from a non-magnetic material, two shafts being coaxially inserted into the bearing hole 2. Furthermore, it is provided with a cylindrical outer rotational shaft 20 which is freely rotatably supported by a pair of outer bearings 11 provided on the inner peripheral surface of the case 10 and made from a non-magnetic material. Still furthermore, it contains a cylindrical inner rotational shaft 30 which is freely rotatably supported by a pair of inner bearing 21 provided on the inner peripheral surface of the hollow portion of the outer rotational shaft 20, and an intermediate portion 31 of the cylindrical inner rotational shaft 30 is covered with a magnetic material.

The magnetic material is a material having a property that it is easily magnetized under magnetic field caused by magnet, current or the like, and conversely the non-magnetic material is a material having a property that it is hardly magnetized.

An outer magnetic member 12 made from a magnetic material is provided between the case 10 and the outer rotational shaft 20, and likewise an inner magnetic member 22 is also provided between the outer rotational shaft 20 and the inner rotational shaft 30. Furthermore, an outer rotational shaft intermediate portion 28 which covers the outer peripheral surface of the outer rotational shaft 20 and is made from a magnetic material is provided on the confronting surface of the outer magnetic member 12. Magnets 13 and 23 are provided to the intermediate portions of the respective magnetic members 12, 22 under the state that the magnetic pole surfaces thereof face the axial direction. Projecting portions 14, 24 which are triangular in a cross-section are formed on the inner peripheral surfaces of the respective magnetic members 12, 22 so as to be arranged in the axial direction.

Minute gaps are respectively formed between the inner peripheral surface of the outer magnetic member 12 and the outer peripheral surface of the outer rotational shaft intermediate portion 28 and between the inner peripheral surface of the inner magnetic member 22 and the outer peripheral surface of the intermediate portion 31 of the inner rotational shaft 30, and magnetic fluid (not shown) is filed in these minute gaps.

The magnetic fluid is liquid in which ferromagnetic ultrafine particles are stably dispersed, and it is a material having a property that it is magnetized by the effect of the magnetic field of the magnets 13, 23.

The magnetic force occurring from the magnets 13, 23 has a property that it passes along a route having a high magnetic permeability and also it goes to the opposite pole by the shortest distance. Therefore, it magnetizes the magnet peripheral areas of the respective magnetic members 12, 22 and forms a constant magnetic stream. Here, the minute gap portions surrounding the projecting portions 14, 24 provided on the inner peripheral surfaces of the respective magnetic members 12, 22 have small magnetic permeability. Furthermore, the cross-sectional areas of the projecting portions 134, 24 in the magnetic force route are reduced, so that the magnetic densities at the projecting portions 14, 24 are increased. Therefore, the magnetic force concentrates to the projecting portions 14, 24, so that the magnetic stream is attracted to the tips of the projecting portions 14, 24 to magnetize the tips of the projecting portions 14, 24.

As described above, the magnet 13 forms an outer magnetic circuit 15 passing through the magnetized outer magnetic member 12, the magnetic fluid and the outer rotational shaft intermediate portion 28. Furthermore, the magnet 23 forms an inner magnetic member 25 passing through the magnetized inner magnetic member 22, the magnetic fluid and the intermediate portion 31 of the inner rotational shaft 30. As a result, the magnetic fluid is held between the projecting portion 14, 24 and the outer peripheral surface of each rotational shaft 20, 30, and thus the respective rotational shafts 20, 30 can be sealed and supported in a non-contact style by the magnetic fluid.

In the biaxial rotational magnetic fluid seal device, the case and the outer rotational shaft which are made from the non-magnetic material are brought into contact with the outer peripheral surfaces of the outer magnetic member and the inner magnetic member, respectively. The magnetic field caused by the magnet interposed between the respective magnetic members is blocked off by the non-magnetic material, and thus no magnetic circuit is formed in the outer peripheral surface direction of each magnetic member. Accordingly, the magnetic circuit is formed so as to extend from one magnet in only one direction.

In the case of the construction as described above, the magnetic fluid seal device requires individual magnets to form respective magnetic circuits for plural rotational shafts, so that the number of parts is increased, the structure is complicated, and also the device grows in size.

SUMMARY OF THE INVENTION

The present invention has an object to provide a magnetic fluid seal device that is reduced in the outer-shape dimension and the number of parts.

In order to attain the above object, the present invention has a biaxial rotation structure which contains a case having a shaft bearing formed therein and an outer bearing provided on the inner peripheral surface of the bearing hole, a cylindrical outer rotational shaft supported freely rotatably by the outer bearing in the bearing hole, an inner bearing provided on the inner peripheral surface of a hollow portion of the outer rotational shaft, and an inner rotational shaft supported freely rotatably by the inner bearing in the hollow portion of the outer rotational shaft, wherein a magnet is provided to the outer rotational shaft, an outer magnetic circuit passing through the case and an inner magnetic circuit passing through the inner rotational shaft are formed by magnetic force occurring from the magnet, magnetic fluid is filled in a minute gap which is in a formation area of the outer magnetic circuit and between the case and the outer rotational shaft, and magnetic fluid is filled in a minute gap which is in a formation area of the inner magnetic circuit and between the outer rotational shaft and the inner rotational shaft.

Here, it is preferable that the case, the outer rotational shaft and the inner rotational shaft are made from magnetic materials in the formation area of at least the outer magnetic circuit or the inner magnetic circuit.

The magnet provided to the outer rotational shaft forms magnetic circuits for the two shafts of the outer rotational shaft and the inner rotational shaft. The formed magnetic circuits seal the magnetic fluid to support the respective two rotational shafts in a non-contact style. According to the magnetic fluid seal device of the present invention, the magnet provided to the outer rotational shaft forms the magnetic circuits for the two shafts, and thus reduction of the number of parts, simplification of the structure and miniaturization of the device can be performed.

Furthermore, a plurality of projecting portions are formed on the inner peripheral surface of the case or the outer peripheral surface of the outer rotational shaft so as to be arranged at a portion which is a formation area of the outer magnetic circuit and filled with the magnetic fluid. Still furthermore, a plurality of projecting portions may be formed on the inner peripheral surface of the outer rotational shaft or the outer peripheral surface of the inner rotational shaft so as to be arranged at a portion which is a formation area of the inner magnetic circuit and filled with the magnetic fluid.

The magnetic force passes through a route having high magnetic permeability. Therefore, the projecting portions can concentrate the magnetic force thereto, and the magnetic fluid is attracted to the tips of the projecting portions. As a result, the outer rotational shaft or the inner rotational shaft are strongly sealed by the magnetic fluid, and the rotational shafts can be supported in a non-contact style with excellent resistance to pressure.

It is preferable that the outer rotational shaft is provided with an annular magnet embedding groove which is open to the inner peripheral surface or outer peripheral surface of the outer rotational shaft is formed so as to be dug down in a radial direction of the outer rotational shaft, a magnet is disposed in the magnet embedding groove, and the formation portion of the magnet embedding groove forms a magnetic force saturation area having a small thickness in the outer rotational shaft.

Since the bottom portion of the magnet embedding groove is thin in wall thickness and thus the cross-section area in the magnetic force passing direction is small, the magnetic force hardly passes through the bottom portion, and thus the bottom portion is saturated immediately by passage of a little magnetic force. Accordingly, most of magnetic force generated by the magnet can be directed to the inner rotational shaft, and a strong magnetic circuit can be formed. The outer rotational shaft is joined in the axial direction by the magnetic force saturation area, so that it can be processed as a single part, the number of parts can be reduced and the manufacturing cost can be reduced.

AS described above, according to the present invention, there can be provided the magnetic fluid seal device in which the dimension can be reduced and the number of parts can be reduced.

DETAILED DESCRIPTION OF THE INVENTION

Figure 1:
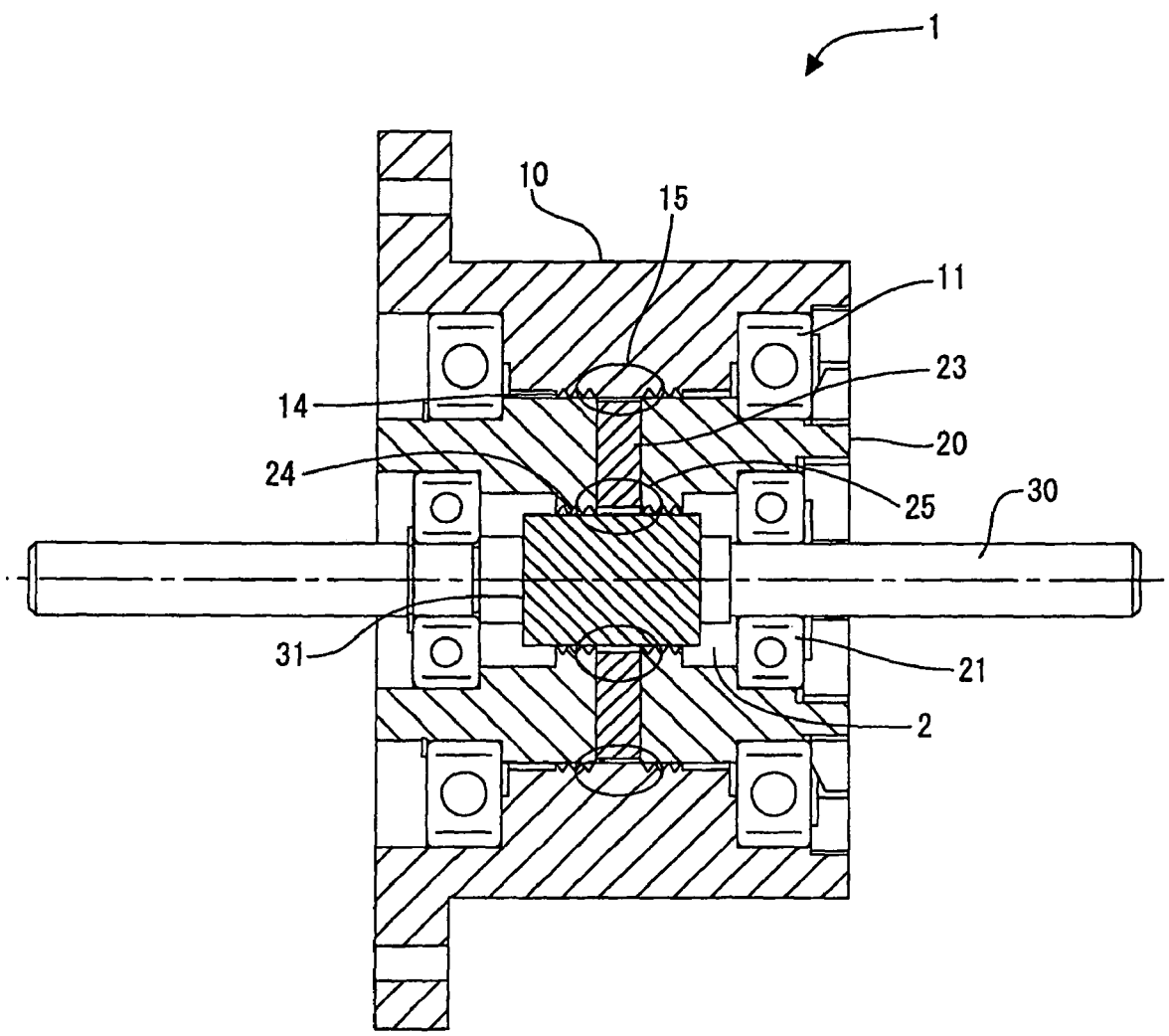
FIG. 1 is a side cross-sectional view showing the construction of a biaxial rotational magnetic fluid seal device according to an embodiment of the present invention.

An embodiment according to the present invention will be described hereunder in detail with reference to the drawings. FIG. 1 is a side cross-sectional view showing the construction of a biaxial rotational magnetic fluid seal device according to an embodiment of the present invention.

In this embodiment, the same parts as or corresponding parts to the prior art are represented by the same reference numerals, and the detailed description thereof is omitted.

As shown in FIG. 1, the case 10 has a cylindrical peripheral surface and is provided with a bearing hole 2 therein so that two shafts of an outer rotational shaft 20 and an inner rotational shaft 30 are coaxially insertable through the bearing hole 2. Projecting portions 14 are provided at predetermined places on the inner peripheral surface of the case 10 so as to be arranged in the axial direction. The case 10 is made from a magnetic material which is easily magnetized.

The outer rotational shaft 20 is inserted in the bearing hole 2 of the case 10, and freely rotatably supported by an outer bearing 11 provided on the inner peripheral surface of the case 10. The outer rotational shaft 20 is made from a magnetic material as in the case of the case 10, and projecting portions 24 are provided at predetermined places on the inner peripheral surface of the outer rotational shaft 20 so as to be arranged in the axial direction. Furthermore, minute gaps are provided between the outer peripheral surface of the outer rotational shaft 20 and the inner peripheral surface of the case 10 and between the inner peripheral surface of the outer rotational shaft 20 and the inner peripheral surface of the intermediate portion 31 of the inner rotational shaft 30, and magnetic fluid is filled in these minute gaps.

The projecting portions 14, 24 provided on the inner peripheral surface of the case 10 and the inner peripheral surface of the outer rotational shaft 20 are designed to have a mountain-like shape, and they have a function of attracting the magnetic fluid filled around them.

Figure 2:
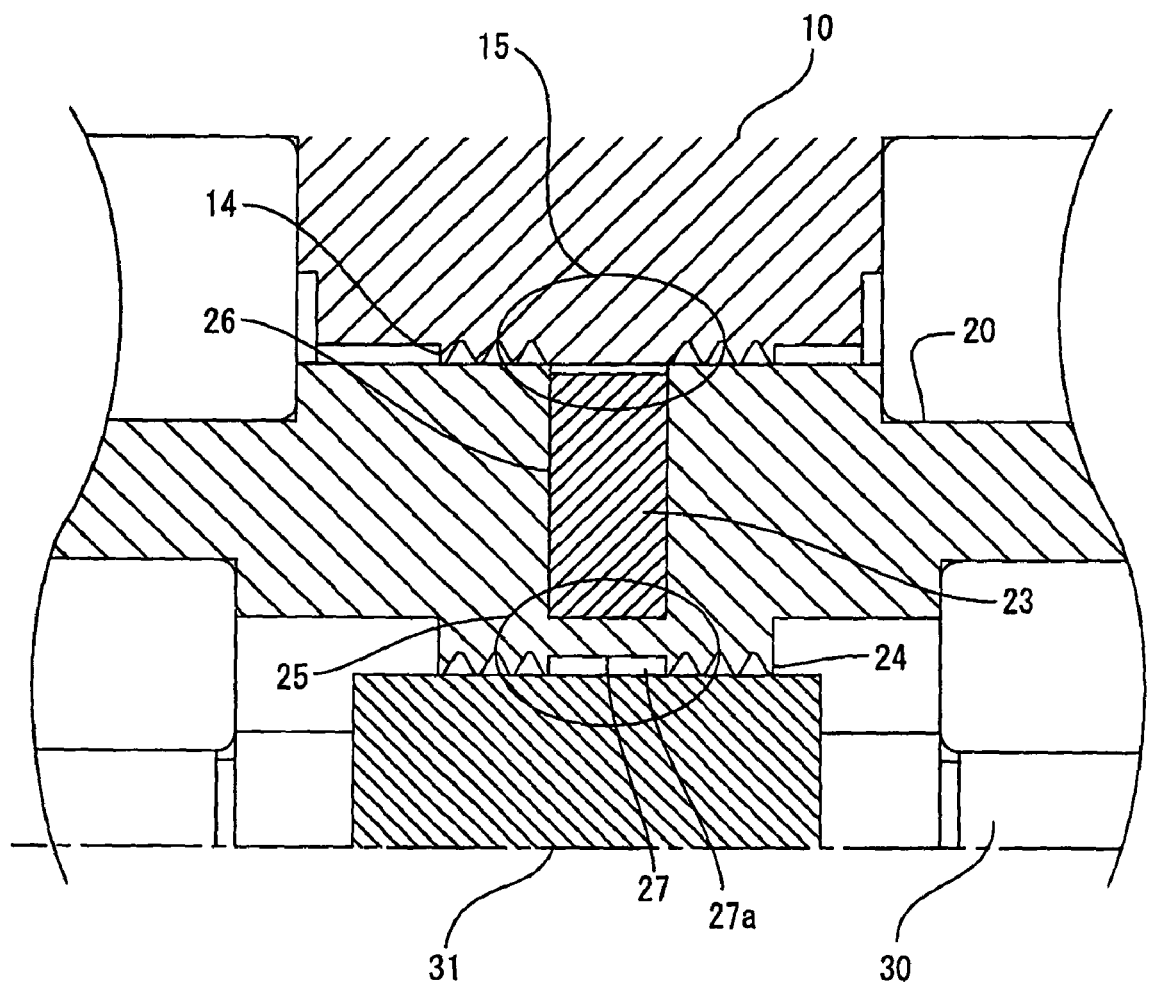
FIG. 2 is an enlarged side cross-sectional view showing a main structure of the biaxial rotational magnetic fluid seal device shown in FIG. 1.

FIG. 2 is an enlarged side cross-sectional view showing the structure of a main part of the biaxial rotational magnetic fluid seal device shown in FIG. 1.

As shown in FIG. 2, an annular magnet-embedding groove 26 is formed on the outer peripheral surface of the outer rotational shaft 20 so as to be dug downwardly in the radial direction. The magnet embedding groove 26 is deeply dug downwardly to be near to the inner peripheral surface of the outer rotational shaft 20, and the magnet 23 is inserted in the magnet embedding groove 26. The bottom portion of the magnet embedding groove 26 forms a magnetic force saturation area 27. In the magnetic force saturation area 27, the outer rotational shaft 20 is set to be small in thickness, and also a gap 27a is formed between the magnetic force saturation area 27 and the confronting intermediate portion 31 of the inner rotational shaft 30. The magnetic permeability of the inside of the gap 27a is small. Accordingly, in the magnetic force saturation area 27, the magnetic force is immediately set to a saturated state in the thickness direction.

In this embodiment, the magnet embedding groove 26 is provided on the outer peripheral surface of the outer rotational shaft 20. However, it may be provided on the inner peripheral surface of the outer rotational shaft 20.

By adopting the construction as described above, the outer rotational shaft 20 is joined in the axial direction in the magnetic force saturation area 27, and thus it can be processed as a single part. However, as occasion demands, there may be used of a method of dividing the outer rotational shaft 20 into plural parts and thereafter joining these parts.

The magnet 23 inserted in the outer rotational shaft 20 is inserted while the magnetic pole surface faces in the axial direction.

The inserted magnet 23 magnetizes the surrounding magnetic material and magnetic fluid to form a magnetic circuit, and thus it is required to have more than a certain amount of magnetic force. Therefore, it is preferable to apply material having strong magnetic force such as neodymium iron boron type, neodymium iron type or the like to the magnet 23, for example. Furthermore, by varying the capacity of the magnet embedding groove 26, the volume of the magnet 23 may be increased/reduced as occasion demands, thereby strengthening the magnetic force.

The magnet 23 forms two magnetic circuits of the outer magnetic circuit 15 passing through the case 10, and the inner magnetic circuit 25 passing through the intermediate portion 31 of the inner rotational shaft 30.

The outer magnetic circuit 15 magnetizes the case 10, the magnetic fluid and the outer rotational shaft 20 in the magnetic field formed by the magnetic force occurring from the magnet 23, thereby holding the magnetic fluid in the minute gap. Here, with respect to the magnetic fluid existing in the gap portion, the projecting portions 14 forming high magnetic densities narrow the minute gap more and more, and thus the magnetic force concentrates to the projecting portions 14, so that the magnetic fluid is attracted to the tips of the projecting portions 14 and held at those portions.

As shown in the figure, the shape of the projecting portions to which the magnetic force concentrates is not limited to the triangular shape in a cross section or mountain-like shape in section, and any structure is possible insofar as the cross-section area of the place where the magnetic fluid is sealed in is reduced.

The magnetic force emitted from the magnet 23 is saturated in the magnetic force saturation area 27 and spreads to the surrounding area thereof, whereby the inner magnetic circuit 25 is formed. That is, the magnet 23 magnetizes the outer rotational shaft 20, the magnetic fluid and the inner rotational shaft 30 in the magnetic field thereof, thereby holding the magnetic fluid in the minute gap.

The magnetic fluid which is attracted to the tips of the projecting portions 14, 24 by the respective magnetic circuits 15, 25 seals the minute gap between the case 10 and the outer rotational shaft 20 and the minute gap between the outer rotational shaft 20 and the inner rotational shaft 30. As a result, the rotational shafts can be supported in the non-contact style, and a magnetic fluid seal device having excellent resistance to pressure can be implemented.

By the construction as described above, both the outer rotational shaft 20 and the inner rotational shaft 30 can be magnetically sealed by only the magnet 23 embedded in the outer rotational shaft 20, so that the number of parts can be reduced and the device can be miniaturized.

The present invention is not limited to the above embodiment, and various applications or modifications may be made as occasion demands. For example, in this embodiment, the magnetic material is applied to the case 10 and the outer rotational shaft 20 to integrally form them. However, the magnetic material may be provided to only the surrounding area of the magnet 23.

<<Modification 1>>

Figure 3:
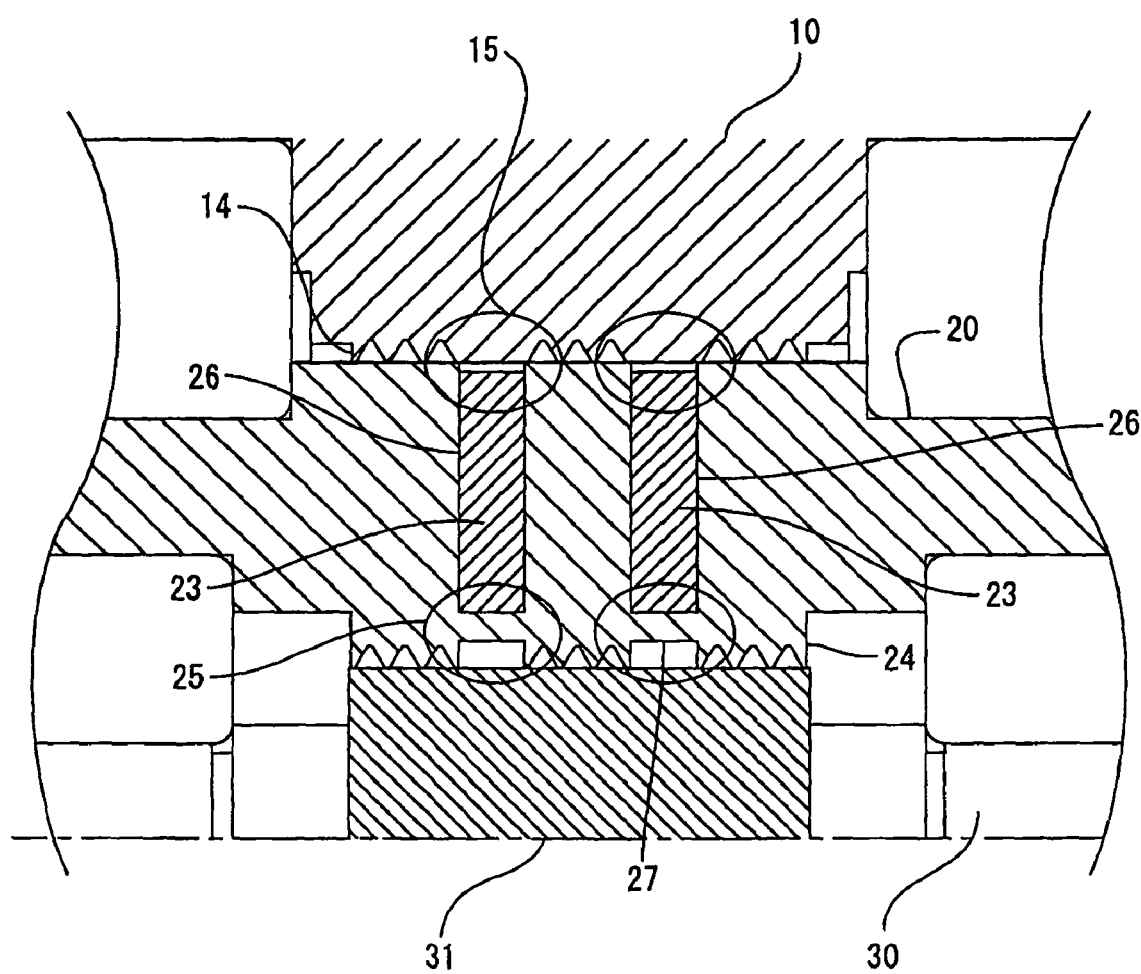
FIG. 3 is a main-part enlarged side cross-sectional view of a modification of the present invention.

FIG. 3 is a main-part enlarged cross-sectional view showing a modification of the present invention.

In the construction shown in FIG. 3, two magnets are embedded and arranged in the outer rotational shaft 20. That is, in the device of the modification 1, the magnet embedding grooves 26 are provided at two places of the outer rotational shaft 20 so as to be spaced from each other at a fixed interval in the same axial direction, and the two magnets 23 are embedded so that the same magnetic pole surfaces thereof confront each other. According to this construction, the outer magnetic circuit 15 and the inner magnetic circuit 25 can be formed at two places in the axial direction. The magnetic forces in the gap between the confronting same magnetic pole surfaces repel each other, so that the magnetic flux is locally distributed in the direction to the outer peripheral surface or inner peripheral surface of the outer rotational shaft 20 to attract the magnetic fluid. Accordingly, more strong magnetic field is formed and the holding power of the magnetic fluid can be enhanced.

In the construction of the modification 1 described above, plural magnets are used. However, all the magnets are embedded in the outer rotational shaft 20, and thus the size of the device is not increased. In addition, the structures of the case 10 and the inner rotational shaft 30 are simplified, so that the manufacturing can be easy as a whole.

<<Modification 2>>

Figure 4:
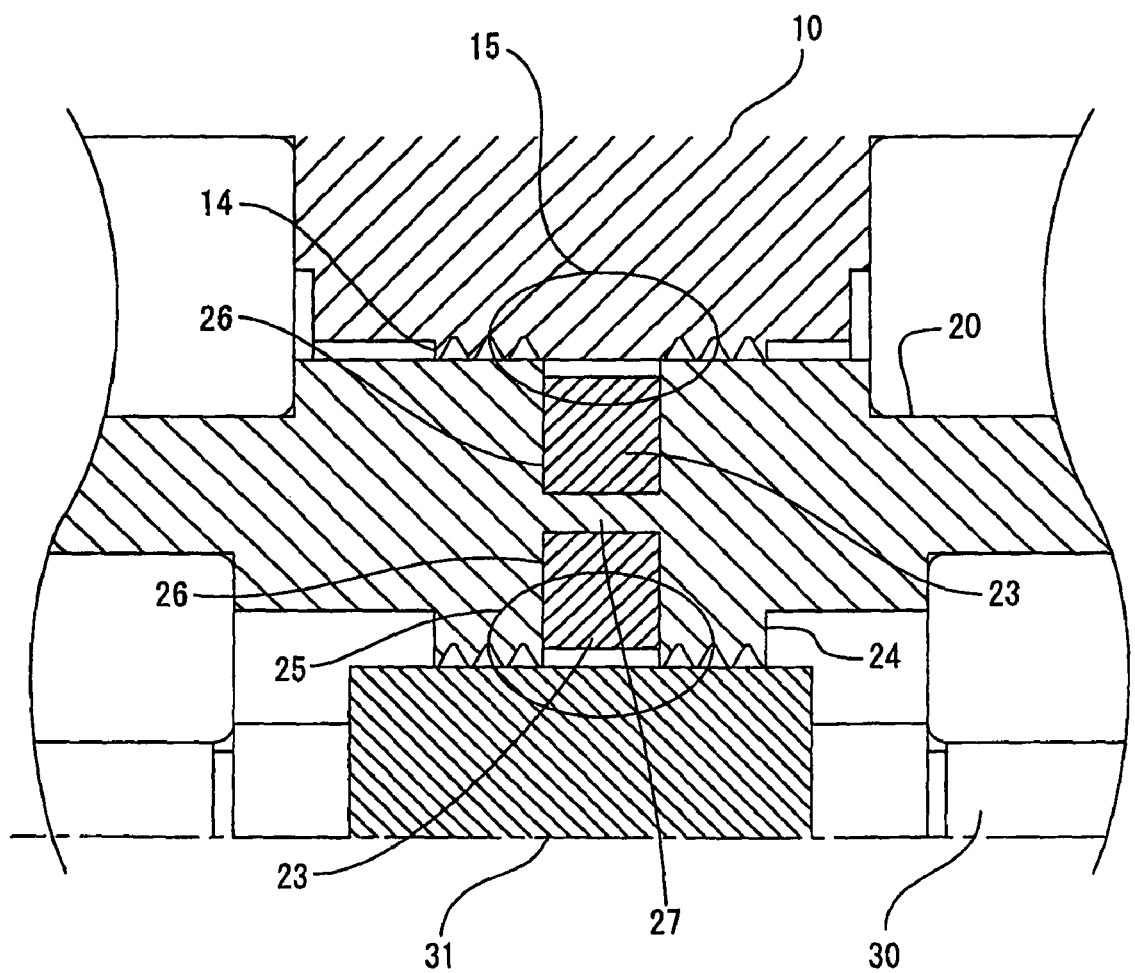
FIG. 4 is a main-part enlarged side cross-sectional view of another modification of the present invention.
Figure 5:
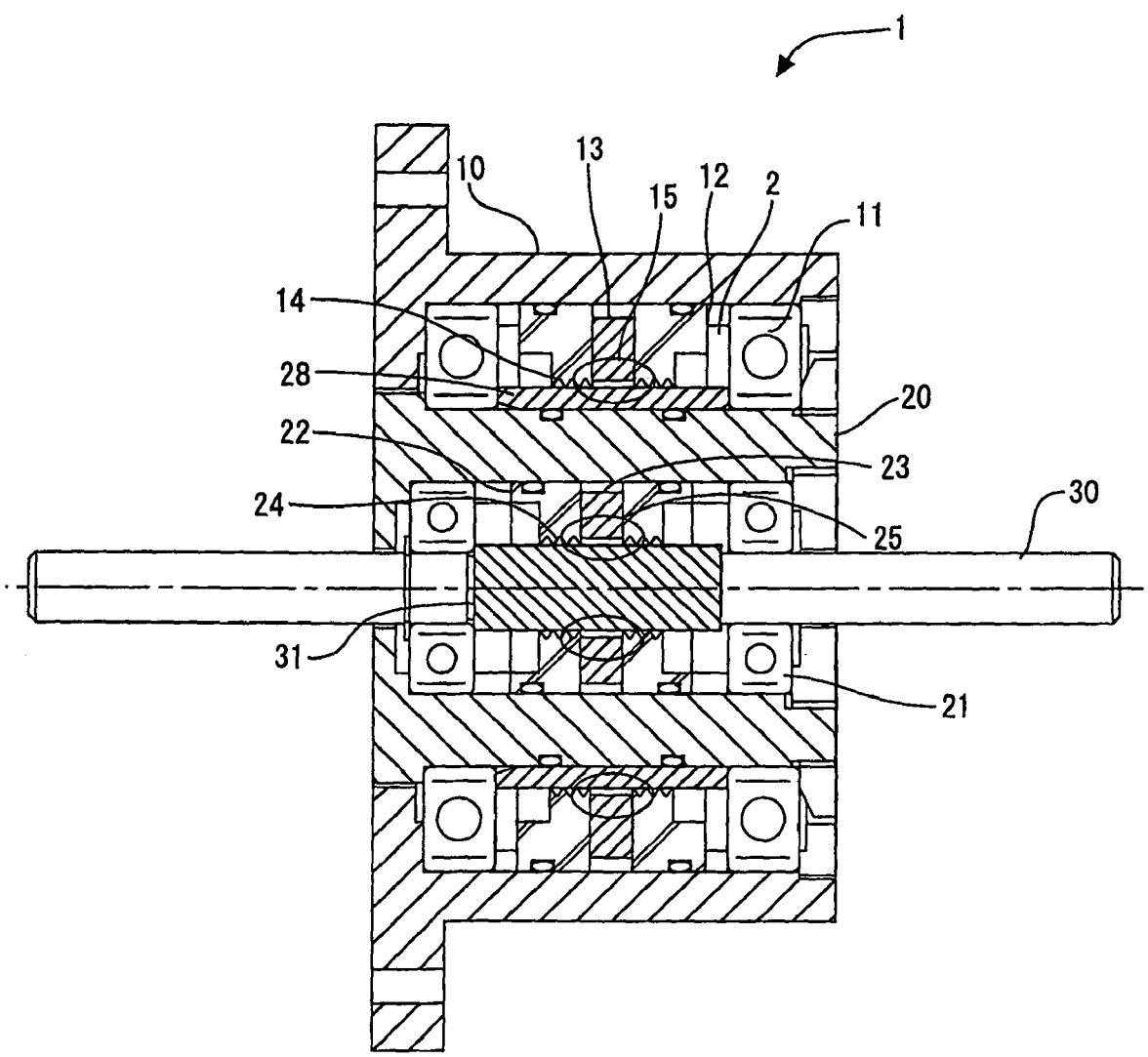
FIG. 5 is a side cross-sectional view showing the construction of a biaxial rotational magnetic fluid seal device of an prior art.

FIG. 4 is a main-part enlarged side cross-sectional view showing another modification of the present invention.

In the construction shown in FIG. 4, the magnet embedding grooves 26 are formed from both the outer peripheral surface and inner peripheral surface of the outer rotational shaft 20, and the magnet 23 is embedded in each magnet embedding groove 26 so that the magnetic pole surfaces thereof face the same direction. The intermediate wall portion of the outer rotational shaft 20 sandwiched between the respective magnet embedding grooves 23 forms a thin-walled magnetic saturation area 27. The magnetic forces occurring from the respective magnets 23 repel each other through the magnetic saturation area 27, and thus the magnetic force hardly goes to the confronting surface side. Accordingly, the magnetic force forming the outer magnetic circuit 15 and the inner magnetic circuit 25 can be more strengthened.

In the construction of the modification 2 described above, as in the case of the modification 1, plural magnets are used. However, all the magnets are embedded in the outer rotational shaft 20, and thus the size of the device is not increased. In addition, the structures of the case 10 and the internal rotational shaft can be simplified, and thus the manufacturing is easy as a whole.

In the modifications 1, 2, the two magnets are used. However, they are not limited to this construction. The magnetic fluid seal device may be designed so that any number of magnet embedding grooves 26 are provide in accordance with the required magnetic density and the magnets 23 are embedded in the magnet embedding grooves 26.

INDUSTRIAL APPLICABILITY

As described above, according to the present invention, there can be provided a magnetic fluid seal device in which the dimension is reduced and the number of parts is reduced.

The invention claimed is:

1. A magnetic fluid sealing device having a biaxial co-axial rotation structure, comprising:
   a case having a shaft bearing formed therein and an outer bearing provided on the inner peripheral surface of the bearing hole;
   a cylindrical outer rotational shaft supported freely rotatably by the outer bearing in the bearing hole;
   an inner bearing provided on the inner peripheral surface of a hollow portion of the outer rotational shaft;
   an inner rotational shaft supported freely rotatably by the inner bearing in the hollow portion of the outer rotational shaft,
   a groove formed in the outer rotational shaft extending radially into the outer rotational shaft;
   a magnet received in the groove extending below a surface of the outer rotational shaft and rotating with the outer rotational shaft;
   a first minute gap between the case and the outer rotational shaft, said first minute gap being filled with magnetic fluid; and
   a second minute gap between the outer rotational shaft and the inner rotational shaft, said second minute gap being filled with magnetic fluid,
   wherein an outer magnetic circuit passing through the case and an inner magnetic circuit passing through the inner rotational shaft are formed by magnetic force occurring from the magnet.

2. The magnetic fluid sealing device according to claim 1, wherein the case, the outer rotational shaft and the inner rotational shaft are made from magnetic materials in the formation area of at least the outer magnetic circuit or the inner magnetic circuit.

3. The magnetic fluid sealing device according to claim 1, wherein the outer rotational shaft comprises a plurality of first projecting portion integrally formed in parallel at the outer peripheral surface of the outer rotational shaft, and the case comprises a plurality of second projecting portion integrally formed in parallel at the inner peripheral surface of the case, the plurality of first projecting portions and the plurality of second projecting portions arranged in a formation area of the outer magnetic circuit that is filled with magnetic fluid.

4. The magnetic fluid sealing device according to claim 1, wherein the outer rotational shaft comprises a plurality of first projecting portion integrally formed in parallel at the inner peripheral surface of the outer rotational shaft, and the inner rotational shaft comprises a plurality of second projecting portion integrally formed in parallel at the outer peripheral surface of the inner rotational shaft, the plurality of first projecting portions and the plurality of second projecting portions arranged in a formation area of the inner magnetic circuit that is filled with magnetic fluid.

5. The magnetic fluid sealing device according to claim 1, wherein said groove is an annular magnet embedding groove which is open to the inner peripheral surface or outer peripheral surface of the outer rotational shaft is formed so as to be recessed in a radial direction into the outer rotational shaft, the magnet is disposed inside of the magnet embedding groove, and the formation portion of the magnet embedding groove forms a magnetic force saturation area having a small thickness in the outer rotational shaft.

6. The magnetic fluid sealing device according to claim 1, in which the outer rotational shaft consists only of magnetically-permeable material.

7. The magnetic fluid sealing device according to claim 1, in which the first minute gap is bordered by the case and the outer rotational shaft, and wherein directly, radially outward of the magnet, perpendicular to an axis of the outer rotational shaft, the outer magnetic circuit excludes any rotational components.

* * * * *